(12) United States Patent
Khoryaev et al.

(10) Patent No.: US 10,200,890 B2
(45) Date of Patent: Feb. 5, 2019

(54) METHODS FOR APERIODIC CSI REPORT TRIGGERING FOR FLEXIBLE SUBFRAMES IN LTE TDD EIMTA SYSTEMS WITH DYNAMIC UL-DL RECONFIGURATION

(71) Applicant: INTEL IP CORPORATION, Santa Clara, CA (US)

(72) Inventors: Alexey Khoryaev, Nizhny Novgorod (RU); Seunghee Han, San Jose, CA (US); Gi Wan Choi, San Jose, CA (US); Jong-Kae Fwu, Sunnyvale, CA (US)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

(21) Appl. No.: 14/583,595

(22) PCT Filed: Sep. 25, 2014

(86) PCT No.: PCT/US2014/057440
§ 371 (c)(1),
(2) Date: Dec. 27, 2014

(87) PCT Pub. No.: WO2015/048277
PCT Pub. Date: Apr. 2, 2015

(65) Prior Publication Data
US 2016/0381587 A1  Dec. 29, 2016

Related U.S. Application Data

(60) Provisional application No. 61/883,127, filed on Sep. 26, 2013.

(51) Int. Cl.
*H04W 24/10* (2009.01)
*H04L 5/00* (2006.01)
(Continued)

(52) U.S. Cl.
CPC .......... *H04W 24/04* (2013.01); *G06F 9/4856* (2013.01); *H04L 1/12* (2013.01); *H04L 1/1607* (2013.01);
(Continued)

(58) Field of Classification Search
None
See application file for complete search history.

(56) References Cited

U.S. PATENT DOCUMENTS 10,014,912 B2 * 7/2018 Li ........................ H04B 7/024
2013/0089043 A1 4/2013 Lunttila et al.
(Continued)

FOREIGN PATENT DOCUMENTS

WO PCT/CN2013/081556 * 7/2014 ............... H04L 5/00

OTHER PUBLICATIONS

Ericsson, ST-Ericsson, "On aPeriodic Reporting of CSI Processes", R1-124541, 3GPP TSG-RAN WG1 #70bis, Agenda Item 7.4.5, Oct. 8-12, 2012.*
(Continued)

*Primary Examiner* — George C Atkins
(74) *Attorney, Agent, or Firm* — Stoel Rives LLP

(57) ABSTRACT

A method to trigger aperiodic CSI reports in LTE TDD systems having dynamic uplink-downlink configurations is proposed. When uplink grants can be sent on any subframe, the method further defines how to indicate which measured subframe set is to be used in reporting the aperiodic CSI. The method is useful for homogeneous networks and networks employing enhanced interference management and traffic adaptation (eIMTA).

16 Claims, 12 Drawing Sheets

(51) Int. Cl.

| | | |
|---|---|---|
| *H04W 72/04* | (2009.01) | |
| *H04W 24/04* | (2009.01) | |
| *H04W 40/22* | (2009.01) | |
| *H04W 52/02* | (2009.01) | |
| *H04W 76/14* | (2018.01) | |
| *H04W 76/38* | (2018.01) | |
| *H04L 12/801* | (2013.01) | |
| *H04W 48/16* | (2009.01) | |
| *H04W 40/24* | (2009.01) | |
| *H04W 88/08* | (2009.01) | |
| *H04W 36/32* | (2009.01) | |
| *H04L 29/08* | (2006.01) | |
| *H04L 1/12* | (2006.01) | |
| *H04L 12/803* | (2013.01) | |
| *H04W 76/18* | (2018.01) | |
| *H04W 76/27* | (2018.01) | |
| *H04W 8/00* | (2009.01) | |
| *G06F 9/48* | (2006.01) | |
| *H04L 1/16* | (2006.01) | |
| *H04L 1/18* | (2006.01) | |
| *H04W 84/12* | (2009.01) | |
| *H04W 92/20* | (2009.01) | |

(52) U.S. Cl.
CPC .......... *H04L 1/1854* (2013.01); *H04L 1/1887* (2013.01); *H04L 5/001* (2013.01); *H04L 5/0035* (2013.01); *H04L 5/0037* (2013.01); *H04L 5/0048* (2013.01); *H04L 5/0055* (2013.01); *H04L 47/12* (2013.01); *H04L 47/122* (2013.01); *H04L 67/025* (2013.01); *H04L 67/104* (2013.01); *H04W 8/005* (2013.01); *H04W 24/10* (2013.01); *H04W 36/32* (2013.01); *H04W 40/22* (2013.01); *H04W 40/24* (2013.01); *H04W 48/16* (2013.01); *H04W 52/0274* (2013.01); *H04W 72/042* (2013.01); *H04W 72/0446* (2013.01); *H04W 72/0453* (2013.01); *H04W 76/14* (2018.02); *H04W 76/18* (2018.02); *H04W 76/27* (2018.02); *H04W 76/38* (2018.02); *H04W 88/08* (2013.01); *H04W 84/12* (2013.01); *H04W 92/20* (2013.01); *Y02D 10/24* (2018.01); *Y02D 10/32* (2018.01); *Y02D 70/1224* (2018.01); *Y02D 70/1242* (2018.01); *Y02D 70/1244* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/164* (2018.01); *Y02D 70/166* (2018.01); *Y02D 70/21* (2018.01); *Y02D 70/22* (2018.01); *Y02D 70/23* (2018.01); *Y02D 70/26* (2018.01)

(56) References Cited

U.S. PATENT DOCUMENTS

| | | | |
|---|---|---|---|
| 2013/0121301 A1 | 5/2013 | Kim et al. | |
| 2013/0315185 A1* | 11/2013 | Kim | H04W 24/10 370/329 |
| 2014/0126476 A1* | 5/2014 | Kang | H04L 1/0026 370/328 |
| 2014/0341051 A1* | 11/2014 | Gaal | H04W 24/10 370/252 |
| 2015/0109973 A1* | 4/2015 | Yao | H04W 72/1231 370/280 |
| 2015/0131568 A1* | 5/2015 | You | H04L 5/001 370/329 |
| 2015/0195056 A1 | 7/2015 | Hong et al. | |
| 2015/0207600 A1* | 7/2015 | Park | H04L 5/005 370/329 |
| 2015/0312936 A1 | 10/2015 | Nguyen et al. | |
| 2016/0050575 A1* | 2/2016 | Seo | H04W 72/04 370/252 |
| 2016/0165578 A1 | 6/2016 | Chen et al. | |
| 2016/0197687 A1* | 7/2016 | Song | H04L 5/00 370/252 |

OTHER PUBLICATIONS

Huawei, Hisilicon, "Details of aperiodic CSI Feedback for CoMP", R1-124069, 3GPP TSG RAN WG1 Meeting #70bis, Agenda Item 7.4.1, Oct. 8-12, 2012.*
LG Electronics, "CSI Measurement and Report for TDD eIMTA", R1-133364, 3GPP TSG RAN WG1 Meeting #74, Agenda Item 7.2.3.1, Aug. 19-23, 2013.*
3GPP TS 36.213 v11.4.0, "3GPP; TSGRAN; E-UTRA; Physical layer procedures (Release 11)", Sep. 20, 2013, see pp. 58-60 and table 8-2.
Huawei, et al., "Triggering and transmission of aperiodic CSI reports", R1-105838, 3GPP TSG RAN WG1 Meeting #63, Jacksonville, USA, Nov. 15-19, 2010, see section 2.
ZTE, "Aperiodic CSI Triggering for Carrier Aggregation in LTE-Advanced", R1-105977, 3GPP TSG RAN WG1 Meeting#63, USA, Nov. 15-19, 2010, see section 2.
International Search Report and Written Opinion received for PCT Patent Application No. PCT/US2014/057440, dated Dec. 29, 2014, 10 pages.
3GPP TS 36.213, "3rd Generation Partnership Project; Technical Specification Group Radio Access Network; Evolved Universal Terrestrial Radio Access (E-UTRA); Physical layer procedures (Release 11)", V11.4.0, Sep. 2013, 182 pages.
Ericsson, ST-Ericsson, "On aperiodic reporting of CSI Processes", R1-124541, 3GPP TSG-RAN WG1 #70bis, San Diego, CA, USA, Agenda Item 7.4.5, Oct. 8-12, 2012, 2 pages.
Huawei, Hisilicon, "Details of aperiodic CSI feedback for CoMP", R1-124069, 3GPP TSG RAN WG1 Meeting #70bis, San Diego, CA, USA, Agenda Item 7.4.1, Oct. 8-12, 2012, 6 pages.
LG Electronics, "CSI Measurement and Report for TDD eIMTA", R1-133364, 3GPP TSG RAN WG1 Meeting #74, Barcelona, Spain, Agenda Item 7.2.3.1, Aug. 19-23, 2013, 5 pages.

* cited by examiner

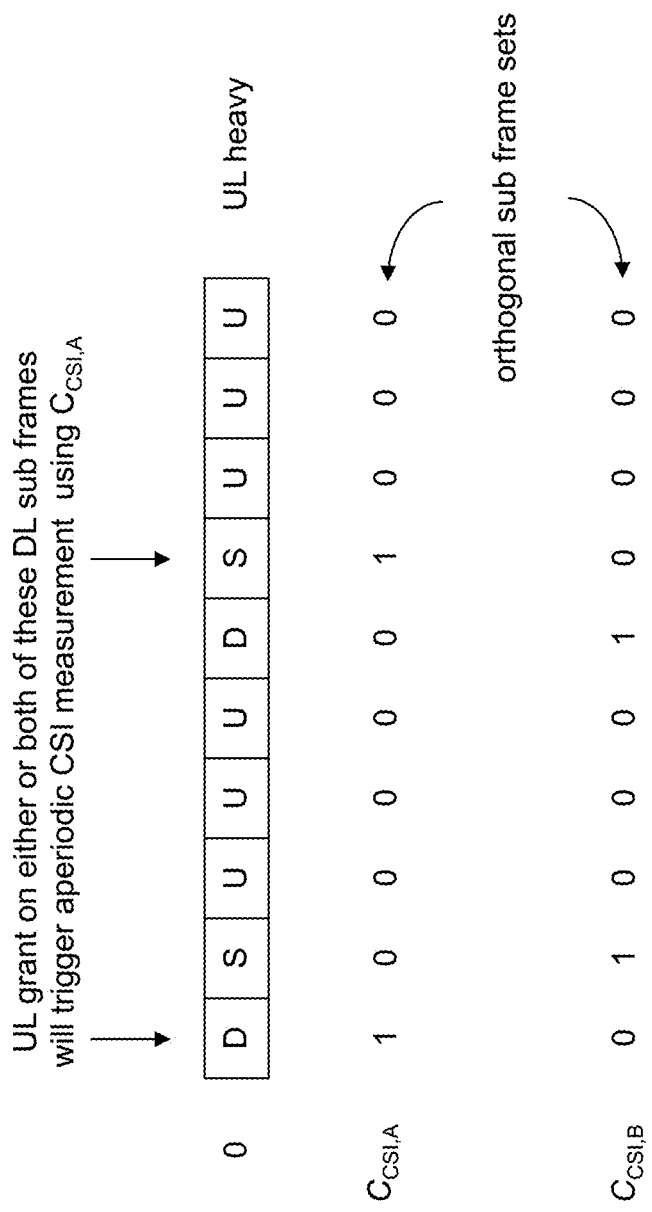

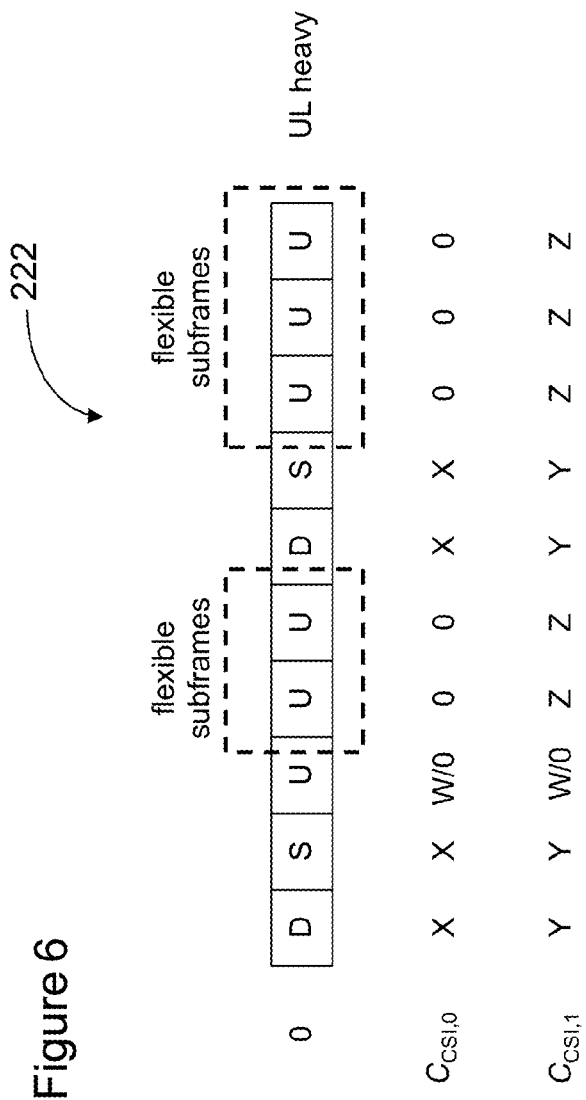

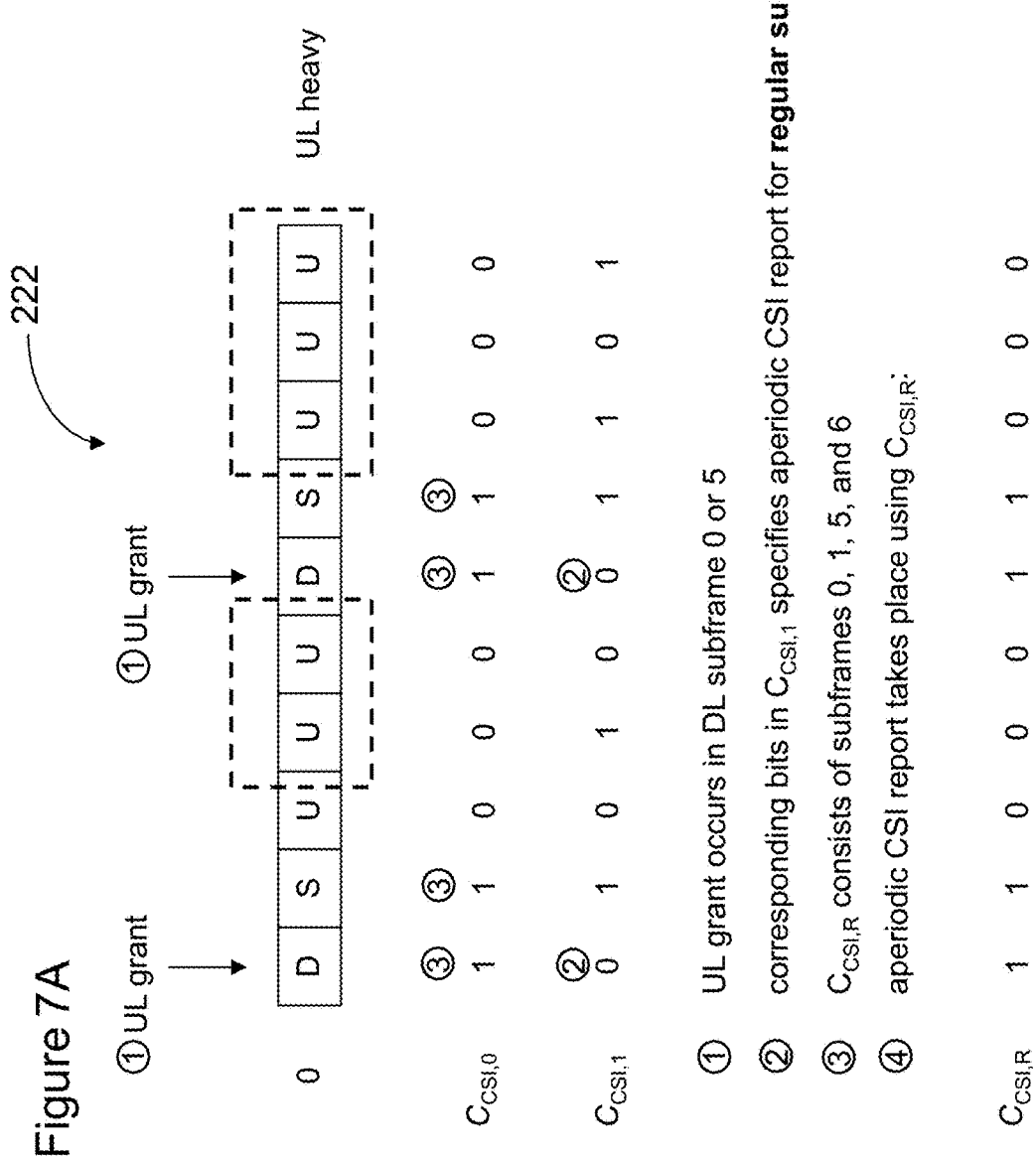

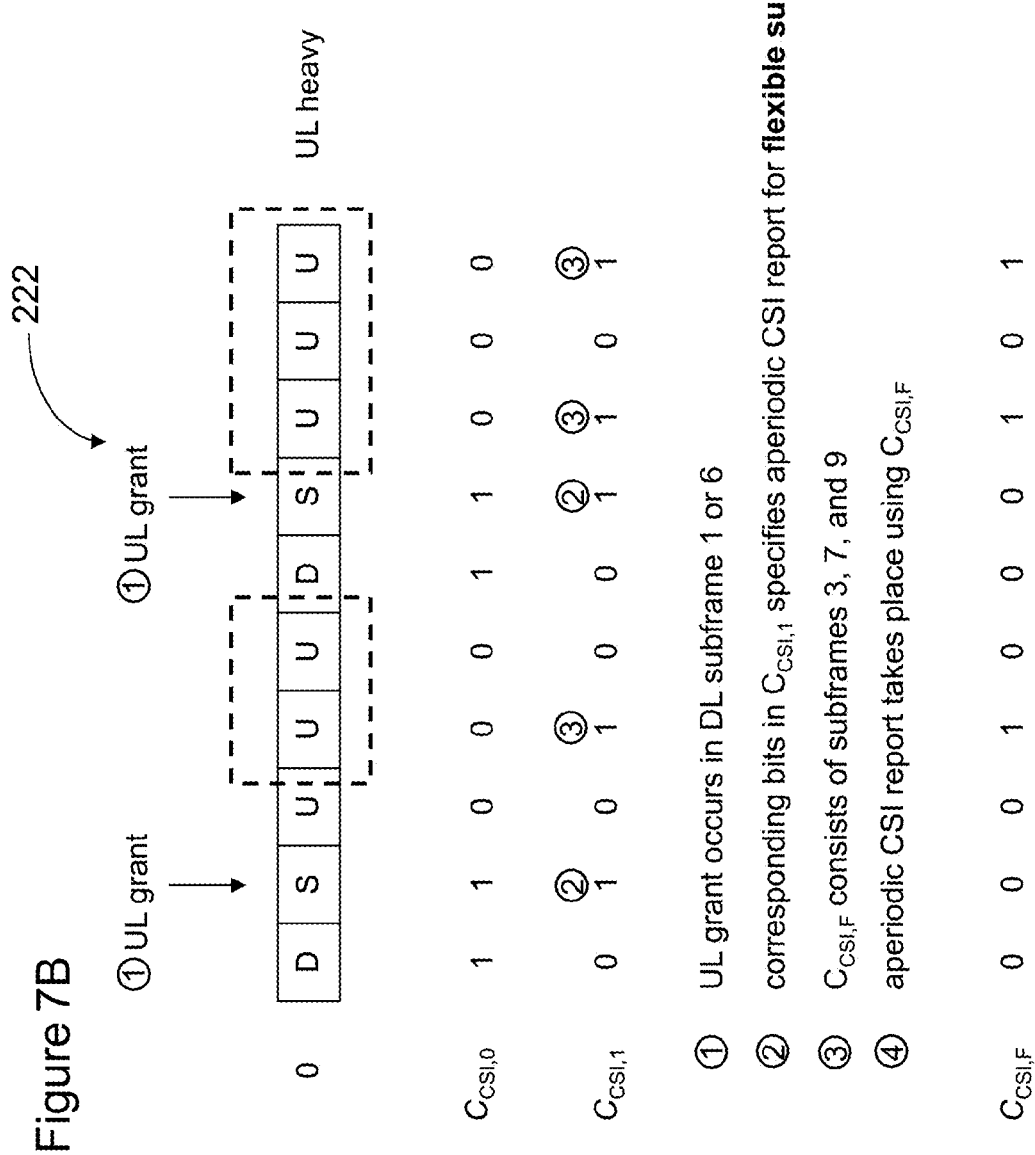

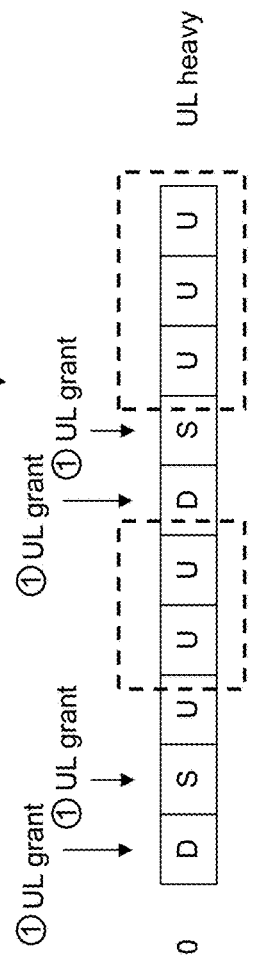
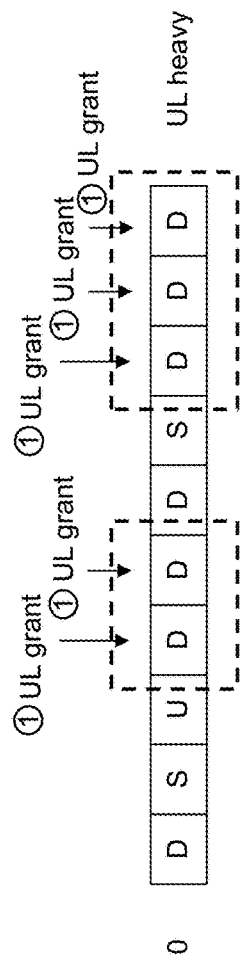

METHODS FOR APERIODIC CSI REPORT TRIGGERING FOR FLEXIBLE SUBFRAMES IN LTE TDD EIMTA SYSTEMS WITH DYNAMIC UL-DL RECONFIGURATION

CROSS-REFERENCE TO RELATED APPLICATION

This application is a continuation of and claims priority to U.S. Provisional Patent Application No. 61/883,127, filed at the United States Patent and Trademark Office on Sep. 26, 2013 and to Patent Cooperation Treaty Application No. PCT/US2014/057440, filed at the United States Patent and Trademark Office on Sep. 25, 2014.

TECHNICAL FIELD

This application relates to heterogeneous networks, enhanced interference management and traffic adaptation (eIMTA), and aperiodic CSI reporting.

BACKGROUND

Wireless mobile communication technology uses various standards and protocols to transmit data between a node (e.g., a transmission station or a transceiver node) and a wireless device (e.g., a mobile device). Some wireless devices communicate using orthogonal frequency-division multiple access (OFDMA) in a downlink (DL) transmission and single carrier frequency division multiple access (SC-FDMA) in an uplink (UL) transmission. Standards and protocols that use orthogonal frequency division multiplexing (OFDM) for signal transmission include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (worldwide interoperability for microwave access), and the IEEE 802.11 standard, which is commonly known to industry groups as WiFi.

In 3GPP radio access network (RAN) LTE systems, the node can be a combination of evolved universal terrestrial radio access network (E-UTRAN) NodeBs (also commonly denoted as evolved NodeBs, enhanced NodeBs, eNodeBs, or eNBs) and radio network controllers (RNCs). The eNBs communicate with the wireless device, known as a user equipment (UE). The DL transmission can be a communication from the node (e.g., eNB) to the wireless device (e.g., UE), and the UL transmission can be a communication from the wireless device to the node.

In homogeneous networks, the node, also called a macro node, can provide basic wireless coverage to wireless devices in a cell. The cell can be the physical region or area inside which the wireless devices are operable to communicate with the macro node. Heterogeneous networks (HetNets) can be used to handle the increased traffic loads on the macro nodes due to the increased usage and functionality of wireless devices. HetNets can include a layer of planned high-power macro nodes (or macro-eNBs) overlaid with layers of lower power nodes (small-eNBs, micro-eNBs, pico-eNBs, femto-eNBs, or home eNBs (HeNBs)) that can be deployed in a less well-planned or even entirely uncoordinated manner within the coverage area (cell) of a macro node. The lower power nodes (LPNs) can generally be referred to as "low power nodes", small nodes, or small cells.

The macro node can be used for basic coverage. The low power nodes can be used to fill coverage holes, to improve capacity in hot zones or at the boundaries between the macro nodes' coverage areas, and to improve indoor coverage where building structures impede signal transmission. Inter-cell interference coordination (ICIC) or enhanced ICIC (eICIC) may be used for resource coordination to reduce interference between the nodes, such as macro nodes and low power nodes, in a HetNet.

HetNets can use time-division duplexing (TDD) or frequency-division duplexing (FDD) for downlink or uplink transmissions. TDD is an application of time-division multiplexing (TDM) to separate downlink and uplink signals. In TDD, DL and UL signals may be carried on the same carrier frequency, where the DL signals use a different time interval from the UL signals. Thus, the DL signals and the UL signals do not generate interference with each other. TDM is a type of digital multiplexing in which two or more bit streams or signals, such as a DL or UL signal, are transferred apparently simultaneously as sub-channels in one communication channel, but are physically transmitted on different time resources. In FDD, a UL transmission and a DL transmission can operate using different frequency carriers. In FDD, interference can be avoided because the DL signals use a different frequency carrier from the UL signals.

Time-division duplexing (TDD) offers flexible deployments without requiring a pair of spectrum resources. Long-term evolution (LTE) TDD allows for asymmetric uplink-downlink (UL-DL) allocations by providing seven different semi-statically configured UL-DL frame configurations, described in more detail below. These predefined LTE frame configurations may include flexible subframes in which some of the subframes originally defined for uplink transmissions may be changed to downlink subframes.

Enhanced Interference Mitigation and Traffic Adaptation (eIMTA), also known as "dynamic TDD", provides such enhancements to LTE TDD systems for more efficient DL-UL traffic management. Under eIMTA, the eNB is able to transmit downlink data using one of the uplink subframes of the radio frame. Thus, the radio frame balance between uplink and downlink allocations can be dynamically changed to meet the instantaneous traffic situation. Significant performance benefits can be obtained by allowing TDD UL-DL reconfiguration based on the instantaneous traffic conditions in small cells, as well as by considering interference mitigation scheme(s).

As the UE operates in a wireless neighborhood, the channel conditions change. This may be due to movement by the UE, the presence of buildings and vehicles in the line of sight of the UE, and other conditions such as, for example, interference from neighboring stations, etc. Channel state information (CSI) is data about the channel conditions and is provided to the eNB by the UE during wireless communication. CSI may include channel quality information (CQI), pre-coding matrix indication, rank indication, and other information about the wireless channel.

There are two CSI reporting modes defined in LTE: aperiodic and periodic. Aperiodic CSI reporting takes place when the eNB makes a request and the UE supplies the CSI report in the PUSCH channel. Support of both CSI reporting modes may be desirable to assess the different interference environment in regular subframes and flexible subframes.

For the aperiodic mode, according to the legacy system behavior, in order to trigger the CSI report for the flexible subframe, the eNB needs to send a UL grant with aperiodic report trigger on one of the flexible subframes. However, due to eIMTA-specific HARQ operation behavior and also considering joint operation with carrier aggregation (CA), coordinated multipoint transmission (CoMP), or a combination of these, it may not always be possible to send UL grants on flexible subframes and new methods for aperiodic CSI triggering need to be defined.

Thus, there is a continuing need for a method to overcome the shortcomings of the prior art.

BRIEF DESCRIPTION OF THE DRAWINGS

The foregoing aspects and many of the attendant advantages of this document will become more readily appreciated as the same becomes better understood by reference to the following detailed description, when taken in conjunction with the accompanying drawings, wherein like reference numerals refer to like parts throughout the various views, unless otherwise specified.

FIGS. 4A and 4B are simplified diagrams showing how aperiodic reporting takes place with legacy TDD LTE systems, according to some embodiments;

FIG. 6 is a simplified diagram illustrating how to redefine CSI measurement subframe sets to trigger aperiodic CSI reports for both regular and flexible subframes according to a first solution, according to some embodiments;

FIGS. 7A-7B illustrate the first solution of FIG. 6, for regular subframes and flexible subframes, respectively, according to some embodiments;

FIGS. 10A and 10B are simplified diagrams illustrating a third solution of the method to trigger aperiodic CSI reports of FIG. 5, according to some embodiments.

DETAILED DESCRIPTION

In accordance with the embodiments described herein, a method to trigger aperiodic CSI reports for flexible subframes is proposed. When uplink grants can be sent on any subframe, the method further defines how to indicate which measured subframe set is to be used in reporting the aperiodic CSI.

In the following detailed description, reference is made to the accompanying drawings, which show by way of illustration specific embodiments in which the subject matter described herein may be practiced. However, it is to be understood that other embodiments will become apparent to those of ordinary skill in the art upon reading this disclosure. The following detailed description is, therefore, not to be construed in a limiting sense, as the scope of the subject matter is defined by the claims.

Figure 1:
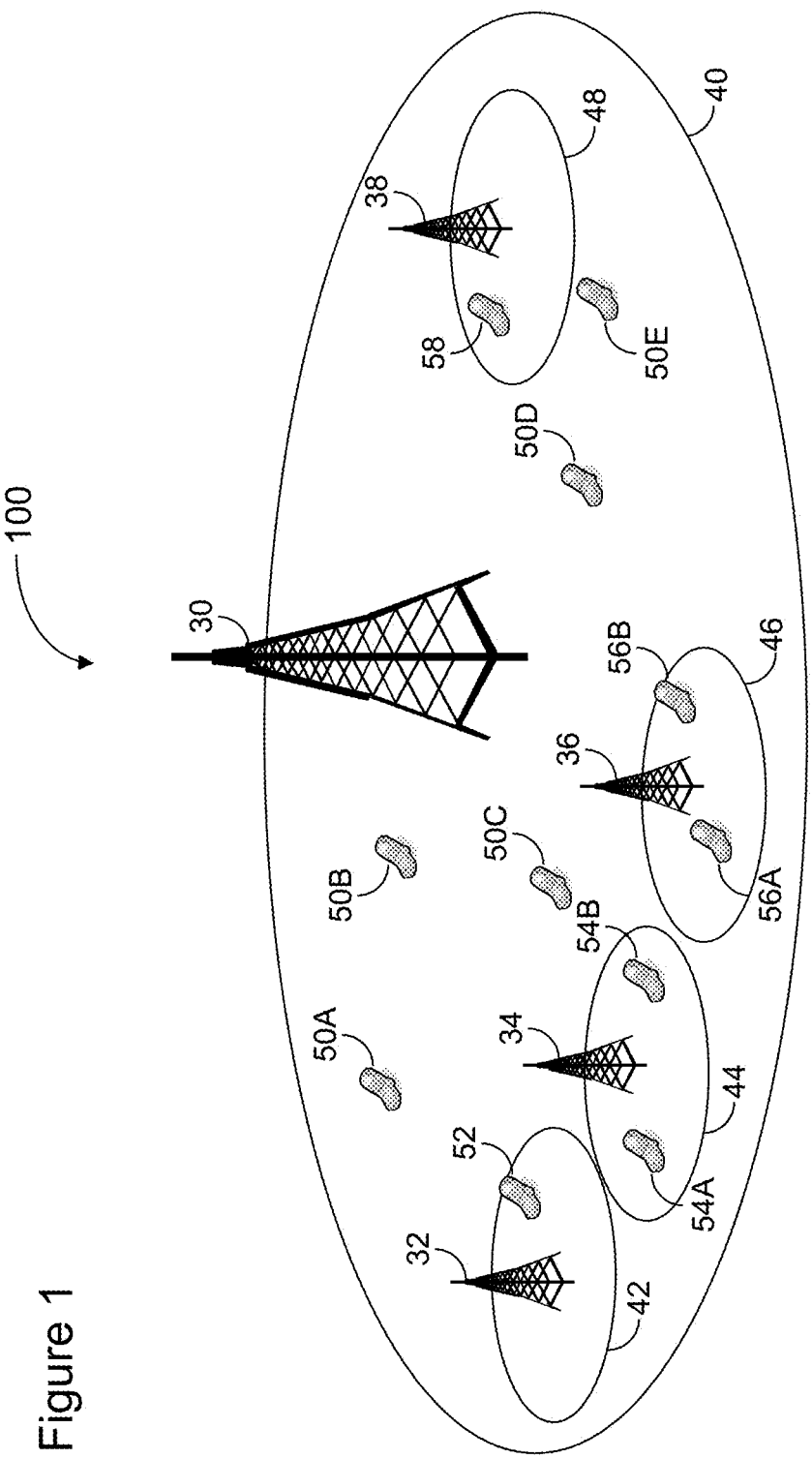
FIG. 1 is a simplified diagram of a heterogeneous network including macro cells and pico cells serving multiple user equipment, according to some embodiments.

FIG. 1 illustrates a heterogeneous network (HetNet) 100, including a macro node 30 (e.g., macro evolved Node B (eNB)) in a macro cell 40, as well as multiple low-power nodes (LPNs) 32, 34, 36, and 38 (or small eNBs) in respective small cells 42, 44, 46, and 48. As used herein, a cell can refer to the node or the coverage area of the node. A low power node (LPN) can refer to a small node, which can include a small eNB, a micro eNB, a pico node, a pico eNB, a femto eNB, a home eNB (HeNB), a remote radio head (RRH), a remote radio equipment (RRE), or a remote radio unit (RRU). As used herein, the term "small node" may be used interchangeably with the term "pico node" (or pico eNB), and the term "small cell" may be used interchangeably with the term "pico cell" in the examples to assist in distinguishing between the macro node and the LPN or the small node, and between the macro cell and the small cell. The macro node can be connected to each LPN via a backhaul link (not shown), such as by using an X2 interface or optical fiber connections.

The HetNet can include macro nodes 30 that can typically transmit at a relatively high power level, for example, approximately 5 watts (W) to 40 W, to cover the macro cell 40. The HetNet can be overlaid with LPNs 32, 34, 36, and 38, which may transmit at substantially lower power levels, such as approximately 100 milliwatts (mW) to 2 W. In an example, an available transmission power of the macro node may be at least ten times an available transmission power of the low power node. An LPN can be used in hot spots or hot-zones, referring to areas with a high wireless traffic load or high volume of actively transmitting wireless devices (e.g., UEs). An LPN can be used in a microcell, a picocell, a femtocell, and/or a home network.

In the example of FIG. 1, a wireless device (e.g., UEs 50A-E, 52, 54A-B, 56A-B, and 58 can be served by the macro node 30 or by one of the LPNs 32, 34, 36, and 38. Wireless devices can be described in relation to the cells (e.g., nodes) in a network. For example, the HetNet 100 of FIG. 1 includes a macro cell 40 and four small cells 42, 44, 46, and 48. Wireless devices primarily served by the macro node 30 in the macro cell coverage area 40 can be referred to as macro UEs (MUEs) 50A-E. Wireless devices primarily served by the small node 32, 34, 36, and 38 (e.g., LPN or pico nodes) in the small cell coverage area 42, 44, 46, and 48 (e.g., pico cells) can be referred to as pico UEs (PUEs) 52, 54A-B, 56A-B, and 58.

HetNet deployments have been recognized to offer efficient means to increase cellular coverage and capacity compared to traditional homogeneous networks. HetNets may involve the co-existence of different radio access technologies, transmission-reception technologies, and base station (eNB) transmission powers, among other possible architectural combinations. For time-division duplexing (TDD) systems and networks, allowing adaptive uplink-downlink (UL-DL) subframe configurations depending on traffic conditions in different cells can significantly improve system performance. Legacy LTE TDD can support asymmetric UL-DL allocations by providing seven different semi-statically configured UL-DL subframe configurations.

Figure 2:
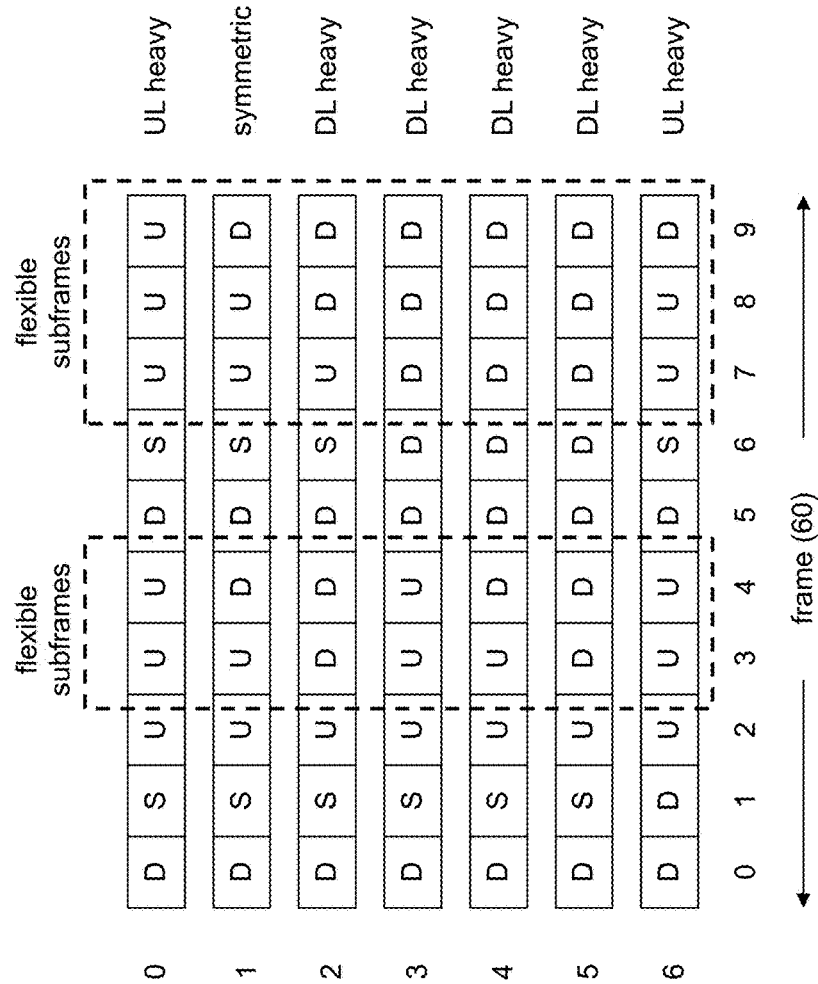
FIG. 2 is a diagram of the legacy LTE TDD semi-statically configured uplink-downlink subframe configurations, according to some embodiments.

As depicted in FIG. 2, the legacy LTE TDD radio frame 60 includes seven UL-DL configurations, numbered 0-6 on the Y axis, each frame having ten subframes, numbered 0-9 on the X axis, which are allocated to either perform uplink or downlink transmissions (with a third special subframe being allocated as a guard time). The sub-frames are labeled such that "D" represents a downlink (DL) subframe, "S" represents a special subframe, and "U" represents an uplink (UL) subframe. The special subframe can operate similar to a downlink subframe relative to the transmission direction.

The UL-DL configurations are known as semi-static because the configurations are not changed very often. Configurations may change due to more UEs entering a wireless neighborhood, movement by the UE, and other factors, such as long-term average traffic statistics.

UL-DL configuration 0 can include six uplink subframes in subframes 2, 3, 4, 7, 8, and 9 and four downlink or special subframes in subframes 0, 1, 5, and 6. UL-DL configuration 5 can include one uplink subframe in subframe 2 and nine downlink or special subframes in subframes, 0, 1, 3, 4, 5, 6, 7, 8, and 9. The UL-DL configuration 0 can be considered an uplink favored (or heavy) UL-DL configuration, and UL-DL configuration 5 can be considered a downlink favored (or heavy) UL-DL configuration.

Thus, for the seven available legacy LTE TDD frames 60, the first (0) and last (6) subframes are UL heavy, the second subframe (1) is symmetric, and the four remaining subframes (2, 3, 4, and 5) are DL heavy. The existing set of legacy TDD UL-DL configurations can provide DL subframe allocations in the range between 40% (e.g., UL-DL configuration 0) to 90% (e.g., UL-DL configuration 5).

The semi-static allocation as defined under legacy LTE may or may not match the instantaneous traffic situation. Advanced UL-DL configurations allow subframes 3, 4, 7, 8, and 9, known as flexible subframes (and outlined in FIG. 2), to change their configuration from the predefined legacy LTE designations.

In an example, cells (e.g., macro cell and small cells) of the network can change the UL-DL configurations synchronously in order to avoid the interference with other cells. However, such a requirement can constrain the traffic management capabilities in different cells of the network.

With legacy LTE, the UL and DL subframe allocation within a radio frame can be reconfigured through system information broadcast (SIB) signaling. Hence, the UL-DL allocation once configured may be expected to vary semi-statically, in an example. Predetermined or semi-statically configured UL-DL configurations may not match the instantaneous traffic situation, resulting in inefficient resource utilization, especially in cells with a small number of users (e.g., UEs) that download or upload large amounts of data.

Adaptive UL-DL configurations can be used to handle cell-dependent traffic asymmetry and match instantaneous traffic situations. For such TDD LTE deployments with different UL-DL configurations in different cells, new types of interferences, including BS-to-BS and UE-to-UE interference can be generated. A type of interference that can impair functionality of the network can be the inter-cell DL→UL (BS-to-BS) interference, which may significantly reduce the benefits obtained from the adaptability of UL-DL configurations in different cells.

The strong level of BS-to-BS (DL-UL) interference between macro cells (in a homogeneous network) or between a macro cell and small cells (in a HetNet) can make dynamic adaptation of UL-DL configuration difficult to implement. To resolve issues with BS-to-BS interference in an example, the LTE TDD networks can align transmission directions of each subframe of the macro cells with the subframes of other cells so the cells work synchronously with each other, effectively avoiding DL-UL inter-cell interference.

The change of UL-DL configuration may cause different interference environments in flexible and regular/static subframes, which may require adjustment of the link adaptation and channel state information (CSI) reporting mechanisms to further optimize LTE-TDD performance.

Referring again to FIG. 2, in LTE TDD systems with dynamic UL-DL configuration adjustments (e.g., flexible subframes), the subframes may be classified in accordance with the possibility to change the transmission directions:
  Regular DL subframes (subframes 0, 1, 5, 6);
  Regular UL subframes (subframe 2);
  Flexible subframes that can be configured as either DL or UL (subframes 3, 4, 7, 8, 9)

In a HetNet, the flexible and regular DL subframes may have different interference environments since the set of active stations transmitting in DL-flexible subframes can be different. For example, some eNBs may use a flexible subframe for downlink transmission while another adjacent eNB uses the same subframe for uplink transmission. Typically, the UL transmission in neighboring cells increases the DL signal to interference-plus-noise ratio (SINR) at the flexible subframes, since the UEs transmit at a lower power level and UE-to-UE propagation experiences higher attenuation. Therefore, the CQI estimated at the regular subframes can be seen as pessimistic relative to the CQI at the flexible subframes, and it is interesting to evaluate this CQI difference and identify scenarios when multiple CSI measurements can be beneficial. The observed DL CQI difference at regular and flexible subframes may depend on DL-UL interference mitigation and traffic adaptation schemes.

CSI Measurement Subframe Sets

Up to two radio resource control (RRC) configured subframe sets, known herein as CSI measurement subframe sets or CSI measurement subframes, can be UE-specifically signaled (per serving cell) to allow separate CSI measurement/reporting. The mechanism of resource-restricted CSI measurements is already supported in the LTE specification. The RRC signaling can configure CSI measurement subframe patterns for the UE with two independent sets of CSI measurement subframes, $C_{CSI,0}$ and $C_{CSI,1}$, that are not permitted to overlap. This mechanism allows the eNB to compare a UE's CSI reports for different sets of subframes.

In application to LTE-TDD eIMTA, the existing CSI measurement subframe sets and signaling can be reused, so that one of the subframe sets ($C_{CSI,0}$) targets CSI measurements on regular DL subframes and the second subframe set ($C_{CSI,1}$) serves for measurements on flexible subframes that can change transmission direction from UL to DL. For an eIMTA system, support of both aperiodic and periodic CSI reporting may be desirable to assess the interference environment on the two subframe measurement sets.

CSI Report Triggering

According to the 3GPP specification 36.213, LTE; Evolved Universal Terrestrial Radio Access (E-UTRA) Physical layer procedures (version 11.7.0 Release 11): A UE shall perform aperiodic CSI reporting using the PUSCH in subframe n+k on serving cell c upon decoding in subframe n either:
  an uplink DCI format, or
  a Random Access Response Grant,
for serving cell c if the respective CSI request field is set to trigger a report and is not reserved.

In 3GPP LTE, aperiodic CSI reporting employs a triggering mechanism to tell the UE when to report the CSI to the eNB. One triggering mechanism is a bit in the downlink control signal (DCI) Format 0-UL grant, which provides resource allocation information for subsequent UL transmissions, known herein as an uplink grant. The eNB transmits the trigger to the UE, after which the UE transmits the measured CSI to the eNB. The measured CSI is transmitted over an uplink feedback channel, inside of the physical uplink shared channel (PUSCH). The CSI measurement includes one or more of channel quality indicator (CQI), precoding matrix indicator (PMI), and rank indicator (RI) for each downlink component carrier (CC).

CSI Reference Signals

UE measurements are performed on downlink reference symbols (RS), either cell-specific reference symbols (CRS) or CSI reference symbols (CSI-RS). CSI-RS, CSI reference resource, for CSI measurements. Not every downlink subframe contains CSI-RS.

Figure 3:
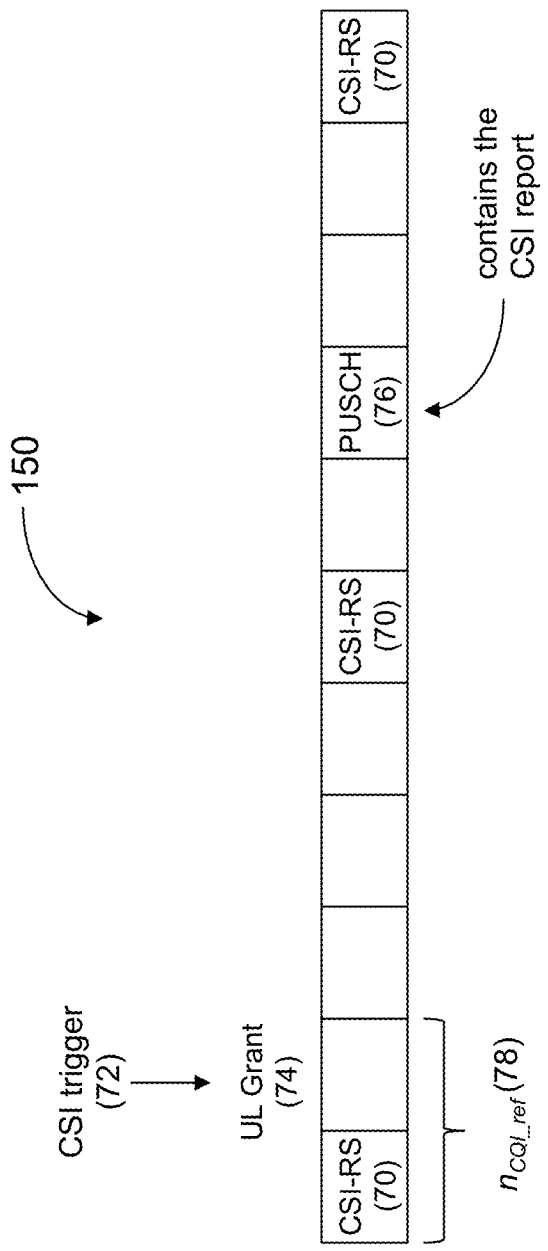
FIG. 3 is a simplified diagram showing the CSI reference signal and its relationship to the CSI trigger, according to some embodiments.

For CSI reporting, the CSI reference resource is explicitly defined by the LTE specification. In the time domain, the CSI-reference resource is defined as follows. For a UE configured in transmission mode 1-9 or transmission mode 10 with a single configured CSI process for the serving cell, the CSI reference resource is defined by a single downlink subframe, $n-n_{CQI\_ref}$.

where, for period CSI reporting, $n_{CQI\_ref}$ is the smallest value greater than or equal to four, such that it corresponds to a valid downlink subframe where, for aperiodic CSI reporting, $n_{CQI\_ref}$ is such that the CSI-RS is in the same valid downlink subframe as the corresponding CSI request in an uplink DCI format Aperiodic CSI report is triggered by downlink control information (DCI Format 0) with the CQI request field set to 1. This is illustrated in FIG. 3, according to some embodiments. Multiple CSI-RSs 70 are periodically disposed in the subframes 150. The CSI trigger 72 coincides with one of the DL subframes where the UL grant 74 is transmitted. Further, the PUSCH subframe 76 following the DL subframes with CSI-RS 70 contains the CSI report and is at least $n_{CQI\_ref}$ 78 subframes from the reference resource.

Aperiodic CSI Report in Legacy LTE Systems

Figure 4B:
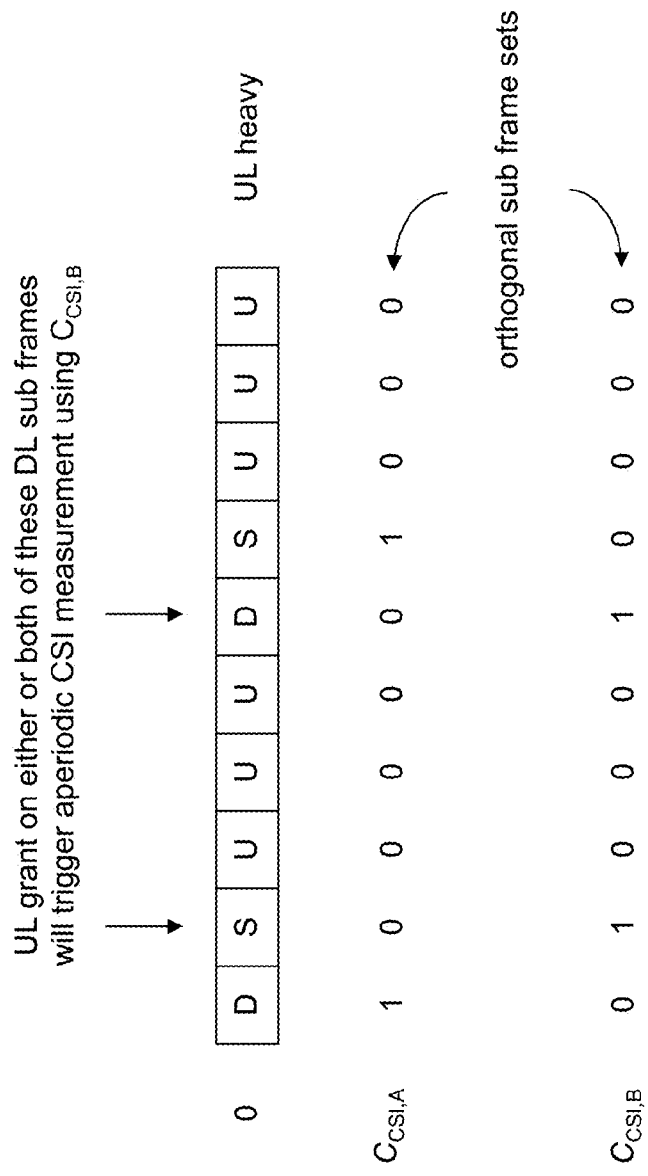

FIGS. 4A and 4B illustrate how aperiodic CSI reporting takes place in a legacy LTE system. The eNB configures two independent and orthogonal CSI measurement subframe sets, $C_{CSI,A}$ and $C_{CSI,B}$. In the 3GPP specification, these measurement subframe sets are known as $C_{CSI,0}$ and $C_{CSI,1}$, but are given a different name to distinguish them from measurement subframe sets used in the method 200, described below. A "1" bit in the each bitmap indicates which subframe is part of that measurement subframe set and the two subframes are mutually exclusive. Thus, if a subframe belongs to a particular measurement subframe set, that same subframe cannot belong to the other measurement subframe set. The UE will perform CSI measurements for the subframe set independently according to instructions from the eNB.

The instructions come in the form of the uplink grant. Once the eNB sends an uplink grant on a downlink subframe, the UE will know for which measurement subframe set the CSI measurements are to be performed. If the uplink grant is sent on a downlink subframe belonging to CSI subframe set A, it means that the eNB requests the UE to perform CSI measurements on the subframes in measurement subframe set A ($C_{CSI,A}$). If the uplink grant is sent on a downlink subframe belonging to CSI subframe set B, it means that the eNB requests the UE to perform CSI measurements on the subframes in measurement subframe set B ($C_{CSI,B}$).

This is illustrated in FIGS. 4A and 4B. In this example, predefined UL-DL frame configuration 0 is used (FIG. 2) although this principle applies to any UL-DL configuration. CSI measurement subframe sets, $C_{CSI,A}$ and $C_{CSI,B}$, are indicated. The particular subframes making up the CSI subframe sets created by the eNB may look different from what is depicted in FIGS. 4A and 4B, although it is known that the subframes making up the bitmap for one CSI subframe set be mutually exclusive of the subframes for the other.

The UL grants are sent by the eNB on a DL subframe only. In FIG. 4A, the UL grant occurs on either DL subframe 0 or special subframe 6 (which, for these purposes, is classified as a DL subframe), or both subframe 0 and subframe 6. Typically each DL subframe may have one UL grant to the given UE. There may be an exception in the case of UL-DL configuration 0 since the number of DL subframes is less than the number of UL subframes. Since these subframes belong to the CSI measurement subframe set $C_{CSI,A}$, the UE implicitly knows to send a CSI report to the eNB using CSI measurement subframe set $C_{CSI,A}$. In other words, the CSI report will be based on subframes 0 and 6.

In FIG. 4B, the UL grant occurs on either special subframe 1 or DL subframe 5. Since these subframes belong to CSI measurement subframe set $C_{CSI,B}$, the UE implicitly knows to send a CSI report to the eNB using CSI measurement subframe set $C_{CSI,B}$. In other words, the CSI report will be based on subframes 1 and 5.

The CSI reference resource is linked to the DL subframe measurement set. The DCI UL grant (that triggers the aperiodic CSI report) is sent on DL subframes from the different subframe measurement sets and thus is used to trigger aperiodic reports for different subframe measurement sets.

In case of eIMTA systems, the DL subframes from the different subframe measurement sets may be used to trigger aperiodic reports for different subframe measurement sets. In particular, in order to trigger the CSI report for a flexible subframe, the UL grant with aperiodic report trigger may be sent on one of the flexible subframes.

This may contradict radio access network layer 1 working group (RAN1 WG) agreements that assert the following:

DL HARQ timeline—uses DL-favored UL-DL configurations 2 or 5 (see FIG. 2); and

UL HARQ timeline—uses UL-DL configuration from bit one of the system information block (SIB1) or radio resource control (RRC) configured UL-DL configuration According to these agreements, the downlink control information (DCI) on a flexible subframe cannot be used for scheduling the UL grant. Thus, the aperiodic CSI report for flexible subframes cannot be triggered as illustrated in FIGS. 4A and 4B.

Methods to Trigger Aperiodic CSI Reports

The aperiodic CSI reporting takes place when the eNB makes a request and the UE supplies the CSI report.

For aperiodic CSI reporting, the UL grant with aperiodic report trigger should be sent on one of the flexible subframes to trigger the CSI report for the flexible subframe. In some cases, the UL grants can be sent on any subframe. In other cases, it may not be possible to send UL grants on flexible subframes in order to keep the UL hybrid automatic repeat request (HARQ) timeline under dynamic TDD UL-DL reconfiguration and simplify HARQ operation in eIMTA-capable systems. Even where the CSI reports can be sent on any subframe, how to indicate which measurement subframe set is to be used in aperiodic CSI reporting needs to be defined.

Figure 5:
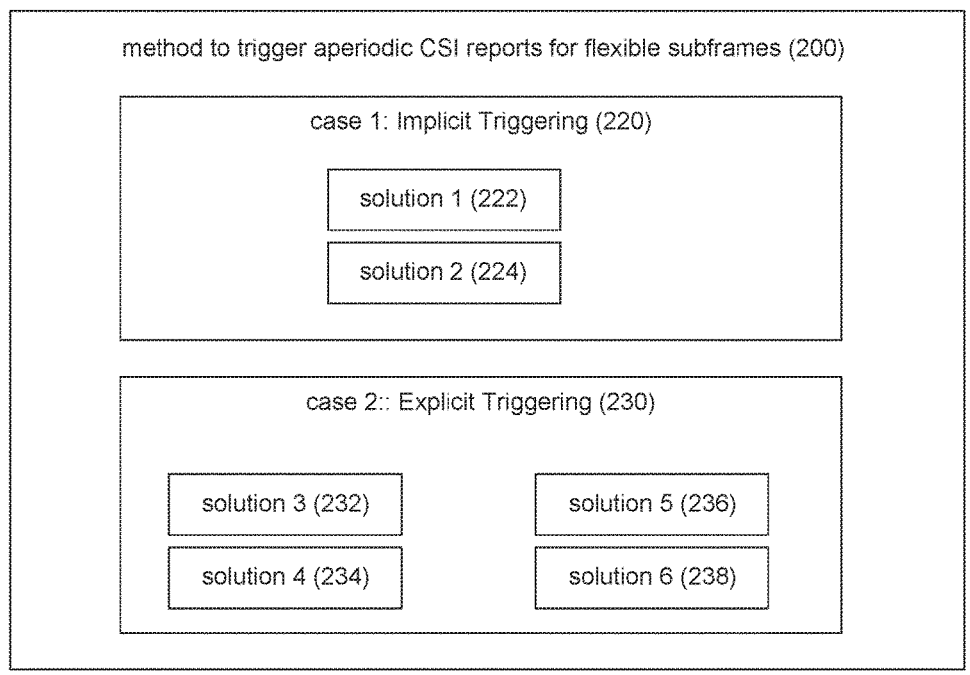
FIG. 5 is a simplified block diagram of a method to trigger aperiodic CSI reporting in a TDD heterogeneous network, according to some embodiments.

Therefore, FIG. 5 illustrates generally a method 200 to trigger aperiodic CSI reports for flexible subframes, according to some embodiments. There are two conditions addressed by the method 200. In a first case 220, the aperiodic CSI report is implicitly triggered for different subframe measurement sets is defined to support the case when UL grants cannot be sent on the flexible subframes (HARQ timing restrictions). In a second more general case 230, the CSI report triggering is explicitly defined. This method may not depend on the DL subframes where UL grants with aperiodic CSI trigger are sent.

Case 1: Implicit Aperiodic CSI Report Triggering for Two Measurement Sets (HARQ Timeline Restrictions)

In the first case 220, the UL grants cannot be sent on flexible subframes, due to UL HARQ timeline restrictions. There are two solutions 222 and 224 proposed herein.

Solution 1 (222)

A first solution 222, in some embodiments, employs two bitmaps defined for the two measurement subframe sets:

$C_{CSI,0}$ for regular subframes; and $C_{CSI,1}$ for flexible subframes

In some embodiments, the bitmaps are either newly defined or reuse existing bitmap patterns for the two measurement subframe sets for $C_{CSI,0}$ and $C_{CSI,1}$. In legacy systems, the two bitmaps $C_{CSI,A}$ and $C_{CSI,B}$ do not overlap and are mutually exclusive of one another, as illustrated in FIGS. 4A and 4B. In contrast, in solution 222, in some embodiments, the two bitmaps may overlap. This enables a logical AND operation to indicate for which measurements subframe set the UL grant triggers the aperiodic CSI report. In some embodiments, aperiodic CSI reports can be triggered for flexible subframes if the UL grant is sent on regular DL subframes which indicate to trigger the aperiodic CSI reports for flexible subframes, as newly defined.

Nevertheless, the eNB needs to be able to indicate to the UE for which measurement subframe set the CSI report is to be generated. Rather than sending the uplink grant on the subframe for which a CSI report is to be made, solution 222 involves an additional indicator, since an uplink grant cannot be sent on flexible subframes.

FIG. 6 provides an illustration of how the bitmaps for $C_{CSI,0}$ and $C_{CSI,1}$ are defined under the first solution 222. These bitmaps are used to generate new bitmaps, $C_{CSI,R}$ and $C_{CSI,F}$, which specify CSI subframe measurements sets for regular and flexible subframes, respectively. The interpretation of $C_{CSI,0}$ and $C_{CSI,1}$ is as follows:

$C_{CSI,0}$: Any bit X set to "1" in the bitmap indicates which regular DL subframe to use for $C_{CSI,R}$. (The X bits may be thought of as the regular subframe bits of $C_{CSI,0}$.) Thus, only "0" bits are shown in the bits corresponding to flexible subframes.

In $C_{CSI,1}$, there are three types of bits, denoted as W, Y, and Z.

The Y bits at the position of regular DL subframes indicate whether the UL grant on these subframes triggers the CSI report for flexible or regular subframes 0→periodic CSI report triggered for regular subframes 1→aperiodic CSI report triggered for flexible subframes The Z bits indicate which subframes make up $C_{CSI,F}$. (The Z bits may be thought of as the flexible subframe bits of $C_{CSI,1}$.)

The W bit is a don't care bit and can be set to 0 by default.

The reason the W bit is a don't care bit is because, for each of the seven available LTE frame configurations (FIG. 2), subframe 2 consists only of UL subframes. Thus, no UL grant can be issued in this subframe and this particular bit of $C_{CSI,1}$ will thus not need to be interpreted.

Another way to look at FIG. 6 is to see that the regular DL subframe carrying the UL grant is used to trigger the aperiodic CSI report for $C_{CSI,F}$ if result of logical operation AND(X,Y)=1, else the aperiodic CSI report is triggered for $C_{CSI,R}$.

FIGS. 7A and 7B provide two examples of how the first solution 222 operates, according to some embodiments. These figures further include step indicators 1, 2, 3, and 4 for ease of understanding. In FIG. 7A, uplink grants are either sent on subframe 0 or on subframe 5 (step 1). As defined above, since subframes 0 and 5 in $C_{CSI,1}$ are set to "0", this means an aperiodic CSI report for regular subframes is to take place (step 2). Any bit in $C_{CSI,0}$ that is set to "1" indicates which regular DL subframe to use for the CSI measurement set for regular subframes, $C_{CSI,R}$ (step 3). (If the bits in step 2 had been "1", the Z bits of $C_{CSI,1}$ would have been interpreted rather than the X bits of $C_{CSI,0}$.) Since bits 0, 1, 5, and 6 are set to "1", this means that regular subframes 0, 1, 5, and 6 will be used for the CSI measurement. Aperiodic CSI reporting will take place using $C_{CSI,R}$ (step 4).

In FIG. 7B, uplink grants are sent on regular DL/special subframe 1 or regular DL/special subframe 6 (step 1). Now, since subframes 1 and 6 in in $C_{CSI,1}$ are set to "1", as indicated where Y=1 in $C_{CSI,1}$, this is interpreted to mean that a CSI report is requested for flexible subframes (step 2). Any of the Z bits in $C_{CSI,1}$ that are set to "1" indicate which flexible subframes to use for the CSI measurement set $C_{CSI,F}$ (step 3). Since bits 3, 7, and 9 are set to "1", this means that flexible subframes 3, 7, and 9 will be used for the CSI measurement set $C_{CSI,F}$. (If the bits in step 2 had been "0", the X bits of $C_{CSI,0}$ would have been interpreted rather than the Z bits of $C_{CSI,1}$.) Aperiodic CSI reporting will take place using the CSI measurement set $C_{CSI,F}$ (step 4).

Figure 8:
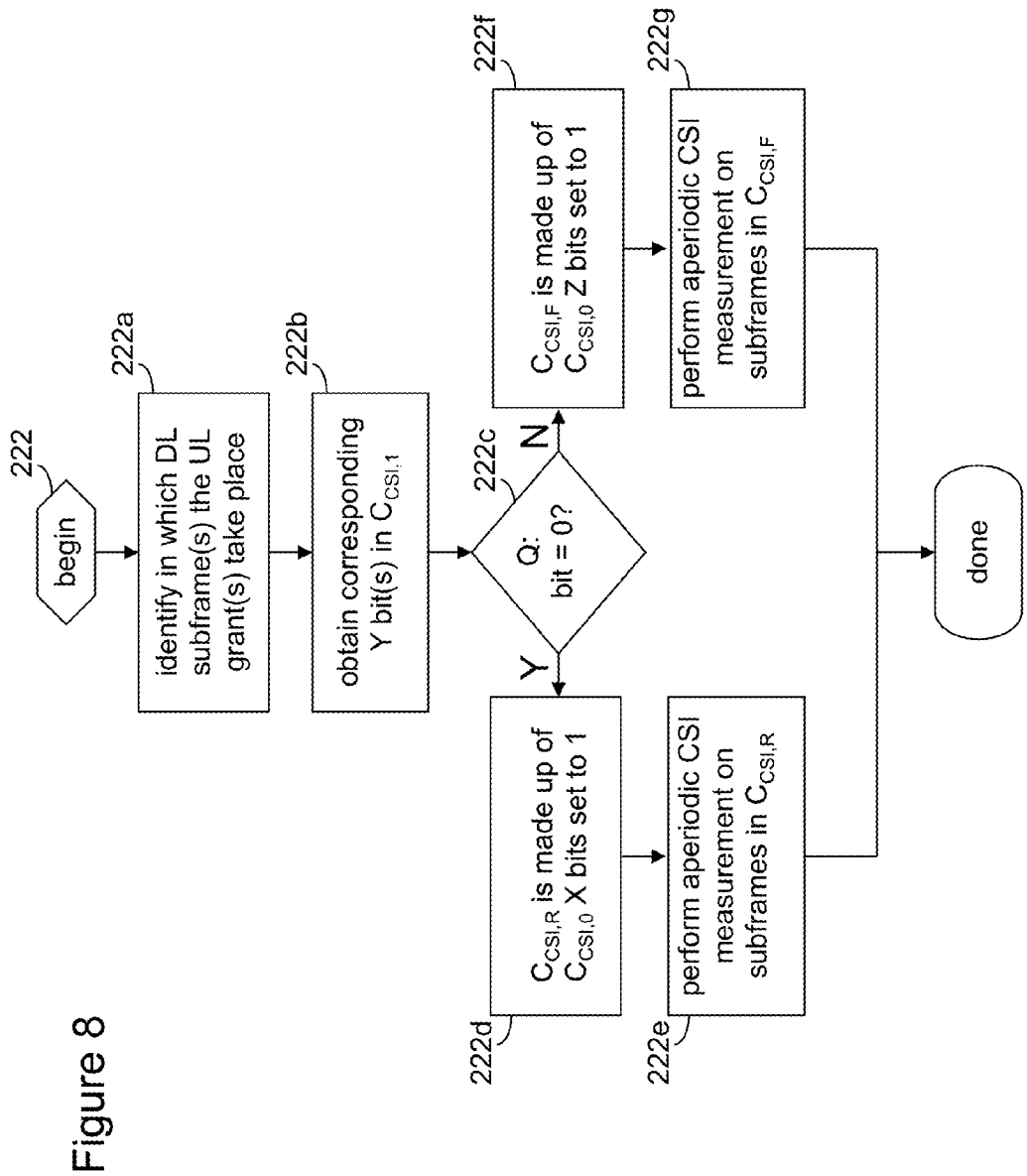
FIG. 8 is a flow diagram illustrating steps taken by a first solution of the method to trigger aperiodic CSI reports of FIG. 5, according to some embodiments.

FIG. 8 is a simplified flow diagram showing how to analyze the two CSI measurement bitmaps, $C_{CSI,0}$ and $C_{CSI,1}$ to produce new CSI measurement sets, $C_{CSI,R}$ and $C_{CSI,F}$ for performing aperiodic CSI reporting using the first solution 222, according to some embodiments. The UL grant is issued by the eNB on one or more DL subframes identified by the UE (block 222a). The corresponding Y bit(s) in $C_{CSI,1}$ is obtained (block 222b). If the corresponding Y bit is a "0" (the "yes" prong of block 222c), CSI measurement set $C_{CSI,R}$ is defined according to the X bits of $C_{CSI,0}$ (block 222d) and the aperiodic CSI measurement takes place on the subframes identified in $C_{CSI,R}$ (block 222e).

Otherwise, the corresponding Y bit of $C_{CSI,1}$ is a "1" (the "no" prong of block 222c). CSI measurement set $C_{CSI,F}$ is defined according to the Z bits of $C_{CSI,1}$ (block 222f) and the aperiodic CSI measurement takes place on the subframes identified in $C_{CSI,F}$ (block 222g).

Solution 2 (224)

Returning to FIG. 5, the method 200 includes a second implicit triggering solution 224, in some embodiments. Here, aperiodic CSI is triggered by a UL grant which schedules PUSCH transmission on either UL regular or flexible subframes. The UL and flexible subframes can be associated/linked with a CSI measurement subframe sets 0 and 1, and/or the triggered aperiodic CSI reports for CSI measurement subframe sets 0 and 1, respectively. In application to LTE TDD eIMTA, according to one of the embodiments a UL grant can be sent on any regular DL subframe to trigger an aperiodic CSI report for flexible subframes as long as the UL grant schedules on the flexible subframes.

Figure 9A:
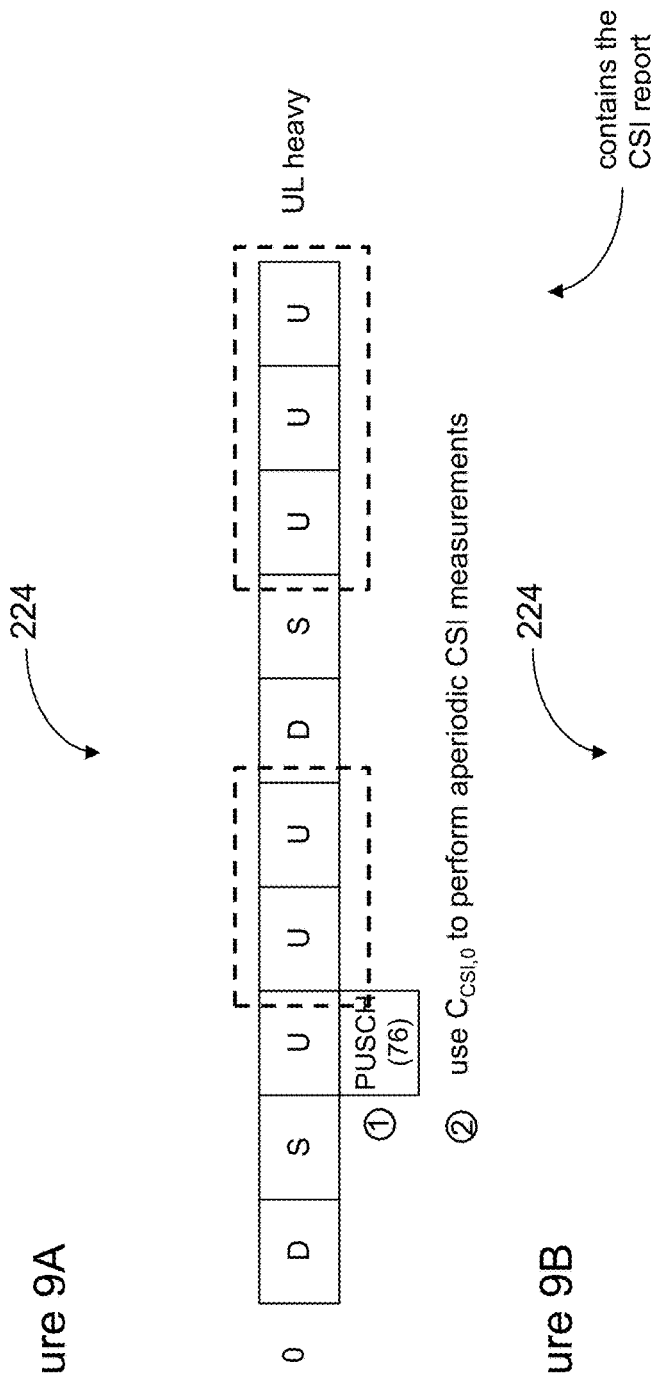
FIGS. 9A and 9B are simplified diagrams illustrating a second solution of the method to trigger aperiodic CSI reports of FIG. 5, according to some embodiments.
Figure 9B:
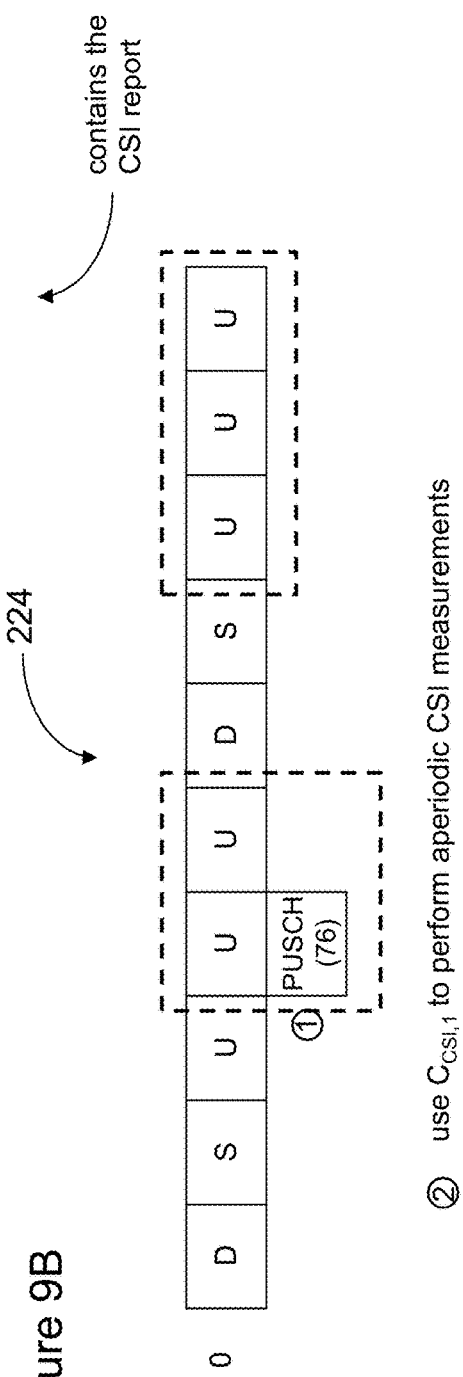

The second solution 224 is illustrated in FIGS. 9A and 9B, according to some embodiments. The idea in solution 224 is to associate uplink subframes with CSI reports corresponding to difference CSI subframe measurement sets. Therefore, if the eNB schedules to transmit on a flexible subframe, then the CSI report for $C_{CSI,1}$ (or $C_{CSI,0}$) is generated, in some embodiments. If, instead, the eNB schedules the UE to transmit on a regular uplink subframe, then the CSI report for $C_{CSI,0}$ (or $C_{CSI,1}$) is generated.

In some embodiments, the second implicit triggering method 224 employs a one-bit CSI request field in DCI Format 0 to request an aperiodic report. This would enable CQI reporting using the first measurement subframe set ($C_{CSI,0}$) or the second measurement subframe set ($C_{CSI,1}$), but not both, since one of the values should indicate no CSI request. An additional bit would be needed to trigger CSI reporting using both measurement sets.

The method 200 thus provides two solutions of implicit triggering, solution 222, illustrated in FIGS. 6, 7A, 7B, and 8, and solution 224, illustrated in FIGS. 9A and 9B, as described above.

Case 2: Explicit Aperiodic CSI Report Triggering for Two Measurement Sets

In some embodiments, the method 200 provides four possible explicit triggering mechanisms 230 to trigger aperiodic reports for flexible subframes. In this second set of solutions, which may work without HARQ timeline restriction, the UL grants can be potentially sent on any subframes and trigger an aperiodic CSI report of one of the CSI measurement subframe sets.

Solution 3 (232)

In a first explicit solution 232, a DL subframe on which the UL grant is sent indicates the measurement subframe set. When two measurement subframe sets are configured, the DL subframe where the UL grant is sent determines the subframe set to be used in the aperiodic CSI report. This method is in the current specification, and can be reused for eIMTA scenarios.

FIGS. 10A and 10B illustrate the solution 232, according to some embodiments. In the FIG. 10A example, if the UL grant is sent in regular DL subframes 0, 1, 5, or 6, a CSI report is sent for CSI measurement subframe set 0 ($C_{CSI,0}$). In the FIG. 10B example, if the UL grant is sent in flexible subframes 3, 4, 7, 8, or 9, a CSI report is sent for CSI measurement subframe set 1 ($C_{CSI,1}$). In the latter case, the flexible subframes would first have to have been converted to downlink subframes in order for the UL grants to be sent to the UE from the eNB. In FIG. 10B, the flexible subframes that are converted to DL subframes are denoted with a "D".

Solution 4 (234)

In a second explicit solution 234, two bits in the uplink DCI format are used to indicate the measurement subframe set(s), in some embodiments. Table 1 shows an example of how solution 234 is implemented, in some embodiments. Four states are defined with the two bits, where either one or both CSI measurement subframe sets can be triggered.

TABLE 1

Predetermined triggering way using two bits

| bits (b0 b1) | description |
| --- | --- |
| 00 | no triggering |
| 01 | CSI report for CSI measurement subframe set 1 ($C_{CSI,1}$) is triggered |
| 10 | CSI report for CSI measurement subframe set 0 ($C_{CSI,0}$) is triggered |
| 11 | both CSI reports for CSI measurement subframe sets 0 and 1 are triggered |

Solution 5 (236)

In a third explicit solution 236, triggered set(s) are configured by radio resource control (RRC) signaling, in some embodiments. Assuming one bit is to be used, the exemplified table is given as follows:

TABLE 2

Triggered set configured by RRC

| bits (b0) | description |
| --- | --- |
| 0 | no triggering |
| 1 | the CSI measurement subframe set(s) configured by RRC are triggered |

In some embodiments, Table 2 is interpreted as follows:
If RRC configures set 0 only, bit "1" triggers set 0 only
If RRC configures set 1 only, bit "1" triggers set 1 only
If RRC configures {set 0, set 1}, bit "1" triggers set 0 and set 1.

As another option for solution 236, the RRC may configure whether the other set is triggered together or not, as illustrated in Table 3, according to some embodiments.

TABLE 3

Triggered set configured by RRC combined with solution 232

| bits (b0) | description |
| --- | --- |
| 0 | no triggering |
| 1 | both set 0 and set 1 are triggered if the RRC signaling is configured to transmit the other set; otherwise, only the linked set according to solution 232 is triggered |

In some embodiments, if two bits are used, Table 4 illustrates yet another option for solution 236:

TABLE 4

Three triggered sets configured by RRC

| bits (b0 b1) | description |
| --- | --- |
| 00 | no triggering |
| 01 | the 1$^{st}$ RRC parameter set is triggered |
| 10 | the 2$^{nd}$ RRC parameter set is triggered |
| 11 | the 3$^{rd}$ RRC parameter set is triggered |

In case when the second and third RRC parameter sets are not configured, the field 10 and 11 are not used. Therefore, the UE may use the bit b0 as a virtual CRC in this case.

Solution 6 (238)

A fourth explicit solution 238 is employed when eIMTA is used together with carrier aggregation (CA) or coordinated multipoint (CoMP) transmission. When eIMTA is used together with CA and/or CoMP, the method 200 is more complicated, in some embodiments. As a general solution to be applied for eIMTA+CA, eIMTA+CoMP, or eIMTA+CA+CoMP, the following can be considered. Note that for CA+CoMP, when the RRC parameter sets are configured, the serving cell and CSI processes are configured together. The detailed parameter in ASN.1 is to define the configured serving cells for each CSI process (e.g., see TS36.331). Thus, a similar mechanism for defining the RRC parameters for eIMTA+CA+CoMP may be used.

The serving cell configuration is defined per each CSI process, and the CSI process configuration is defined per each set for eIMTA, and the set configuration for eIMTA is defined. An example is shown below:

TABLE 5

An example for explicit solution 238.

| bits (b0 b1) | description |
|---|---|
| 00 | no triggering |
| 01 | the linked subframe (e.g., see 1 above) is triggered for the serving cell "c (i.e., SIB linkage) |
| 10 | aperiodic CSI report is triggered for a $1^{st}$ set of CSI subframe set(s) configured by higher layers |
| 11 | aperiodic CSI report is triggered for a $2^{nd}$ set of CSI subframe set(s) |

As described in Table 5 the aperiodic CSI report is triggered for a $1^{st}$ or $2^{nd}$ set of CSI processes or pair of CSI process(es) and CSI subframe measurement set(s) configured by higher layers.

While the application has been described with respect to a limited number of embodiments, those skilled in the art will appreciate numerous modifications and variations therefrom. It is intended that the appended claims cover all such modifications and variations as fall within the true spirit and scope of the invention.

We claim:

1. A user equipment (UE) to be used in a wireless network, comprising:
an electronic memory; and
a processor to:
receive from an evolved NodeB (eNB) through a downlink control signal in the wireless network, a channel state information (CSI) request in a frame, wherein the CSI request comprises a CSI request field of two bits, and wherein the UE is configured by higher layers for enhanced interference mitigation and traffic adaptation (eIMTA) for at least one serving cell; and
generate an aperiodic CSI report if a value of the two bits of the CSI request field indicates that the aperiodic CSI report is triggered and if the value is associated with at least one or more pairs comprising a CSI process and a corresponding CSI subframe measurement set configured by the higher layers, wherein the CSI subframe measurement set specifies which plurality of subframes of the frame are used to generate the aperiodic CSI report; and
discard the CSI request if the value of the two bits of the CSI request field indicates that no aperiodic CSI report is triggered.

2. The UE of claim 1, wherein the wireless device is further configured to transmit the aperiodic CSI report to the eNB through a physical uplink shared channel (PUSCH) in the wireless network.

3. The UE of claim 1, wherein the frame comprises any one or more of downlink (DL) subframes, uplink (UL) subframes, regular subframes, and flexible subframes, wherein the flexible subframe(s) are capable of being changed from UL subframes to DL subframes.

4. The UE of claim 1, wherein the value "00" indicates that no aperiodic CSI report is triggered.

5. The UE of claim 1, wherein the value "01" indicates that the aperiodic CSI report is triggered for at least one of 1) one or more CSI processes and 2) the one or more pairs of the comprising the CSI process and the CSI subframe measurement set configured by the higher layers for the at least one serving cell.

6. The UE of claim 5, wherein the value of "10" indicates that the aperiodic CSI report is triggered for at least one of a) a first set of the one or more CSI processes and b) a first pair of the one or more pairs comprising the CSI process and the corresponding CSI subframe measurement set configured by the higher layers.

7. The UE of claim 6, wherein the value of "11" indicates that the aperiodic CSI report is triggered for at least one of a) a second set of the one or more CSI processes and b) a second pair of the one or more pairs comprising the CSI process and the corresponding CSI subframe measurement set configured by the higher layers.

8. The UE of claim 1, wherein the UE is further configured to use the eIMTA with a coordinated multipoint (CoMP) transmission mechanism.

9. A method, employed by a user equipment (UE) to be used in a wireless network, comprising:
receiving, from an evolved NodeB (eNB) through a downlink control signal in the wireless network, a channel state information (CSI) request in a frame, wherein the CSI request comprises a CSI request field of two bits, and wherein the UE is configured by higher layers for enhanced interference mitigation and traffic adaptation (eIMTA) for at least one serving cell; and
generating an aperiodic CSI report if a value of the two bits of the CSI request field indicates that the aperiodic CSI report is triggered and if the value is associated with at least one or more pairs comprising a CSI process and a corresponding CSI subframe measurement set,
wherein the CSI subframe measurement set specifies which plurality of subframes of the frame are used to generate the aperiodic CSI report; and, to discard the CSI request if the value of the two bits of the CSI request field indicates that no aperiodic CSI report is triggered.

10. The method of claim 9, further comprising:
transmitting the aperiodic CSI report to the eNB through a physical uplink shared channel (PUSCH) in the wireless network.

11. The method of claim 9, wherein the frame comprises any one or more of downlink (DL) subframes, uplink (UL) subframes, regular subframes, and flexible subframes, wherein the flexible subframe(s) are capable of being changed from UL subframes to DL subframes.

12. The method of claim 9, wherein the value "00" indicates that no aperiodic CSI report is triggered.

13. The method of claim 9, wherein the value is "01" indicating that the aperiodic CSI report is triggered for at least one of 1) one or more CSI processes and 2) the one or more pairs of the comprising the CSI process and the CSI subframe measurement set configured by the higher layers for the at least one serving cell.

14. The method of claim 13, wherein the value "10" indicates that the aperiodic CSI report is triggered for at least one of a) a first set of the one or more CSI processes and b) a first pair of the one or more pairs comprising the CSI process and the corresponding CSI subframe measurement set configured by the higher layers.

15. The method of claim 14, wherein the value "11" indicates that the aperiodic CSI report is triggered for the at least one of a) a second set of the one or more CSI processes and b) a second pair of the one or more pairs comprising the CSI process and the corresponding CSI subframe measurement set configured by the higher layers.

16. The method of claim 9, wherein the UE is further configured to use the eIMTA with a coordinated multipoint (CoMP) transmission mechanism.

* * * * *